United States Patent Office 3,651,230
Patented Mar. 21, 1972

3,651,230
COMPOSITIONS AND METHODS FOR TRAN-
QUILIZING WITH SUBSTITUTED 3-PHENYL-
4-QUINAZOLINONE DERIVATIVES
Hisao Yamamoto and Shigeho Inaba, Nishinomiya, Seitetsu Arasaki and Isamu Maruyama, Minoo, Kei Takahaski, Takarazuka, Chiharu Saito, and Shigeru Sakai, Toyonaka, Japan, assignors to Sumitomo Chemical Co., Ltd., Osaka, Japan
No Drawing. Continuation-in-part of application Ser. No. 871,241, June 27, 1969, which is a division of application Ser. No. 680,046, Nov. 2, 1967. This application Apr. 29, 1970, Ser. No. 33,079
Claims priority, application Japan, Nov. 15, 1966, 41/75,386
Int. Cl. A61k 27/00
U.S. Cl. 424—251           5 Claims

ABSTRACT OF THE DISCLOSURE

A tranquilizing agent comprising an effective amount of a quinazolinone derivative of the formula

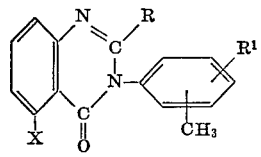

wherein R is an ethyl or propyl group, $R^1$ is a halogen atom, and X is a halogen atom, and a pharmaceutically acceptable carrier. The tranquilizer exhibits potent sedative activity with minimal hypnotic and toxic activity.

---

This application is a continuation-in-part of applicants' copending application Ser. No. 871,241, now abandoned, filed June 27, 1969, which in turn is a divisional application of Ser. No. 680,046, filed on Nov. 2, 1967 and which is also now abandoned.

The present invention relates to a pharmaceutical composition used as a tranquilizer. More particularly, the present invention pertains to a pharmaceutical composition used as a tranquilizer and which contains as an active ingredient, a quinazoline derivative of the formula

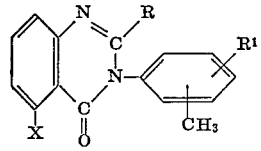

wherein R is an ethyl or propyl group and $R^1$ and X are halogen atoms.

Various 2-alkyl-3-substituted phenyl-quinazolinone derivatives have been produced in recent years and tested in regard to their central nervous system depressing activities (see, for example, British Pat. 982,207 or German Pat. publication 1,124,504). During the investigation of the pharmacological activity of these compounds, the present inventors have found unexpectedly that a number of 2-alkyl-3-substituted-phenyl-quinazolinone derivatives which are substituted with a halogen atom at the 5-position of the quinazolinone ring exhibit excellent tranquilizing action but are very low in hypnotic activity in comparison with similar quinazolinone derivatives which are substituted with a halogen atom at a position other than the 5-position.

An object of the present invention is to provide a pharmaceutical composition which exhibits excellent tranquilizing action with minimal hypnotic activity.

Another object of the present invention is to provide a method for tranquilizing a patient without inducing hypnotic action.

Other objects of the present invention will be apparent from the description as follows.

In order to accomplish these objects, the present invention provides a pharmaceutical composition consisting essentially of an effective amount of a quinazolinone derivative represented by the formula

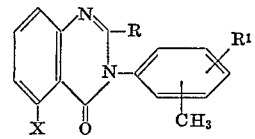

wherein R is an ethyl or propyl group; $R^1$ is a halogen atom and X is a halogen atom, and a pharmaceutically acceptable carrier, such as lactose, glucose, corn starch, talcum powder and the like. The pharmaceutical preparations may be in solid form, e.g. capsules, tablets or dragées. The above preparations are prepared according to standard methods used for the manufacture of pharmaceutically acceptable compositions, which contain 1% to 75% of the active ingredient. They may also contain, in combination, other pharmacologically useful substances.

The quinazolinone derivative of the present invention can be produced by reacting an N-acylanthranilic acid derivative of the formula

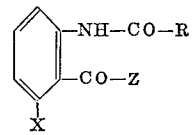

wherein R and X have the same meanings as defined above, and Z is a hydroxyl group, a lower alkoxy group or a halogen atom, with an aniline derivative of the formula

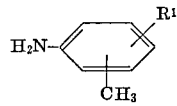

wherein $R^1$ has the same meaning as defined above, in a solvent such as benzene, toluene, xylene, etc. and preferably, in the presence of a phosphorus trichloride, phosphorus oxychloride, polyphosphoric acid or the like.

Specific quinazolinone derivatives used as the active ingredient of the pharmaceutical composition of the present invention may be produced, for example, by the following procedures.

PRODUCTION EXAMPLE 1

To a mixture of 13.7 g. of 2-propionamido-6-chlorobenzoic acid and 9.4 g. of 2-amino-5-chlorotoluene in ml. of toluene was added dropwise a solution of 3.7 g. of phosphorus trichloride in 30 ml. of toluene with stirring under cooling. The resultant mixture is heated under reflux for 15 hours. The reaction mixture was admixed with 10% aqueous solution of sodium carbonate. The toluene layer was separated, dried over anhydrous potassium carbonate and concentrated to dryness under reduced pressure. The residue was washed with water and dried to give 17 g. of crude 2-ethyl-3-(2'-methyl-4'-chlorophenyl)-5-chloro-4(3H)-quinazolinone melting at 139 to 145° C. Recrystallization from ethanol gave white prisms, M.P. 152 to 153° C.

*Analysis.*—Calcd. for $C_{17}H_{14}Cl_2N_2O$ (percent): C, 61.26; N, 8.41; Cl, 21.32. Found (percent): C, 61.16; N, 8.21; Cl, 21.06.

PRODUCTION EXAMPLE 2

The reaction was effected in the same manner as in Example 1 but using 2-butyrylamido-6-chlorobenzoic acid in place of 2-propionamido-6-chlorobenzoic acid whereby 2-n-propyl-3-(2'-methyl - 4' - chlorophenyl) - 5 - chloro-4(3H)-quinazolinone was obtained. M.P., 143 to 144° C.

Analysis.—Calcd. for $C_{18}H_{16}Cl_2N_2O$ (percent): C, 62.25; N, 8.07; Cl, 20.46. Found (percent): C, 62.85; N, 8.09; Cl, 20.22.

It is one of characteristics of the quinazolinone derivatives of the pharmaceutical composition of the present invention that they exhibit markedly potent tranquilizing action while they are low in hypnotic action as well as toxicity. The following pharmacological tests were carried out to compare the properties of the quinazolinone derivatives of the present invention with several other compounds.

Among the quinazolinone derivatives of the present invention, 2-ethyl-3-(2'-methyl - 4' - chlorophenyl)-5-chloro-4(3H)-qinazolinone and 2-propyl-3-(2'-methyl-4'-chlorophenyl)-5-chloro-4(3H)-quinazolinone were selected. Among the other quinazolinone derivatives, 2-methyl-3-(2'-methyl-4'-chloro-phenyl) - 4 - quinazolinone and 2-methyl-3-(2',6'-dimethyl-4'-chlorophenyl) - 7 - chloro-4-quinazolinone were selected. Further, in order to show the potent tranquilizing activity of the quinazolinone derivatives of the present invention, meprobamate was selected as a comparative compound.

Each compound was orally and intraperitoneally administered to group of 15–20 mice, each 18–22 g. in body weight, at a dose level of at least 5, and $LD_{50}$, $HD_{50}$, and $SD_{50}$ were calculated as follows:

(1) $LD_{50}$ (50% lethal dose) was calculated by the method of Litchfield and Wilcoxon (J. Pharmacol. 96, 99 (1949)), from a plotted dosage and the number of mice which died within 1 week.

(2) $HD_{50}$ (50% hypnotic dose) was calculated by the mehtod of Litchfield and Wilcoxon, from a plotted dosage and the number of mice which lost righting reflex for over 20 seconds.

(3) $SD_{50}$ (50% sedative dose) was calculated by the method of Litchfield and Wilcoxon, from a plotted dosage and the number of mice which decreased number of rotation of cage (width 35 mm., radius 95 mm.) by the mice for 15 minutes after the administration, by less than a half of the number of rotation of control mice.

The results of these experiments are indicated in the following table:

of this invention show potent sedative activity, but their hypnotic activity is extremely low, that is the $HD_{50}/SD_{50}$ is extremely large, particularly in case of oral administration. Further, the adverse side effect is very low.

A similar tranquilizing action is also found in the following compounds:

2-isopropyl-3-(2'-methyl-4'-chlorophenyl)-5-chloro-4(3H)-quinazolinone,
2-ethyl-3-(2'-methyl-4'-chlorophenyl)-5-bromo-4(3H)-quinazolinone,
2-n-propyl-3-(2'-methyl-4'-chlorophenyl)-5-bromo-4(3H)-quinazolinone,
2-ethyl-3-(2'-methyl-4'-chlorophenyl)-5-iodo-4(3H)-quinazolinone,
2-ethyl-3-(2'-methyl-4'-bromophenyl)-5-chloro-4(3H)-quinazolinone,
2-n-propyl-3-(2'-methyl-4'-bromophenyl)-5-chloro-4(3H)-quinazolinone,
2-ethyl-3-(2'-methyl-3'-chlorophenyl)-5-chloro-4(3H)-quinazolinone,
2-ethyl-3-(2'-methyl-3'-bromophenyl)-5-chloro-4(3H)-quinazolinone,
2-n-propyl-3-(2'-methyl-5'-chlorophenyl)-5-chloro-4(3H)-quinazolinone, and
2-ethyl-3-(2'-methyl-6'-chlorophenyl)-5-chloro-4(3H)-quinazolinone, etc.

These compounds are also found to be much better than such related compounds as meprobamate and the like in their tranquilizing activity.

The 5-chloro quinazolinone derivatives of the present invention may be treating such mental disturbances as neurosis, insomnia, anxiety and the like. For example, a 20~150 mg. dosage of 2-ethyl-3-(2'-methyl-4'-chlorophenyl)-5-chloro-4(3H)-quinazolinone can be administrated orally one to three times a day to treat psychosomatic disturbances.

We claim:

1. A solid pharmaceutical composition used as a tranquilizing agent, which consists essentially of an effective tranquilizing amount of a quinazolinone derivative of the formula

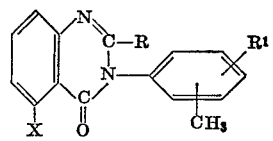

wherein R is an ethyl group or a propyl group; R' is a

TABLE

[Acute toxicity, hypnotic, and sedative activity of quinazolinone derivatives and meprobamate in mice]

| Compound | Route | Acute toxicity, $LD_{50}$ mg./kg. | Hypnotic dose, $HD_{50}$ mg./kg. | Sedative dose, $SD_{50}$ mg./kg. | $HD_{50}/SH_{50}$ |
|---|---|---|---|---|---|
| 2-ethyl-3-(2'-methyl-4'-chlorophenyl)-5-chloro-4(3H)-quinazolinone (the present invention) | i.p. | 1,520 | 1,640 | 29 | 57 |
| | p.o. | <2,000 | 1,620 | 81 | 20 |
| 2-propyl-3-(2'-methyl-4'-chlorophenyl)-5-chloro-4(3H)-quinazolinone (the present invention) | i.p. | <1,000 | <1,000 | 23 (9.2-58) | <43 |
| | p.o. | <1,000 | <1,000 | 40 (21-78) | <25 |
| 2-methyl-3-(2'-methylphenyl)-4-quinazolinone | i.p. | 555 | 42 | 35 | 1.2 |
| | p.o. | 1,130 | 95 | 39 | 2.2 |
| 2-methyl-3-(2'-methyl-4'-chlorophenyl)-4-quinazolinone | i.p. | | 38 | 36 | 1.1 |
| | p.o. | <500 | 75 | 45 | 1.7 |
| 2-methyl-3-(2',6'-dimethyl-4'-chlorophenyl)-7-chloro-4-quinazolinone | i.p. | <500 | <200 | <200 | ca. 1.0 |
| | p.o. | <1,000 | <400 | <400 | ca. 1.0 |
| Meprobamate | i.p. | 740 | 255 | 260 | 1.1 |
| | p.o. | 1,610 | 405 | 350 | 1.1 |

As shown in the table, there is a significant difference between the $HD_{50}/SD_{50}$ of the compounds of this invention and that of the other comparative compounds. As pointed out above, the larger the $HD_{50}/SD_{50}$, the better the tranquilizer. For these reasons it is clear that the compounds of this invention are far superior as tranquilizers than the compounds of the references. The compounds halogen atom and X is a halogen atom, and a pharmaceutically acceptable carrier.

2. A pharmaceutical composition according to claim 1, wherein the quinazolinone derivative is 2-ethyl-3-(2'-methyl-4'-chlorophenyl)-5-chloro - 4(3H) - quinazolinone or 2-propyl-3-(2'-methyl - 4' - chlorophenyl)-5-chloro-4(3H)-quinazolinone.

3. A method for tranquilizing a patient, which comprises administering to the patient a quinazolinone derivative of the formula

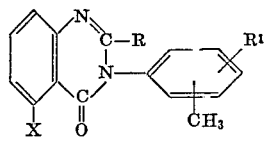

wherein R is an ethyl or propyl group, R' is a halogen atom and X is a halogen atom, in an oral dose of 20~450 mg./day.

4. A method according to a claim 3, wherein the quinazolinone derivative is 2 - ethyl-3-(2'-methyl-4'-chlorophenyl)-5-chloro-4(3H)-quinazolinone or 2-propyl-3-(2'-methyl-4'-chlorophenyl)-5-chloro-4(3H)-quinazolinone.

5. A method according to claim 3, wherein the quinazolinone derivative is orally administered.

References Cited

FOREIGN PATENTS 982,207          Great Britain.

STANLEY J. FRIEDMAN, Primary Examiner

U.S. Cl. X.R.

260—250